US009633110B2

(12) United States Patent
Mendelovich et al.

(10) Patent No.: US 9,633,110 B2
(45) Date of Patent: Apr. 25, 2017

(54) ENRICHMENT OF DATA USING A SEMANTIC AUTO-DISCOVERY OF REFERENCE AND VISUAL DATA

(75) Inventors: Meir Mendelovich, Kfar Saba (IL); Eugene (John) Neystadt, Kfar Saba (IL); Dany Hoter, Yaad (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 410 days.

(21) Appl. No.: 13/296,903

(22) Filed: Nov. 15, 2011

(65) Prior Publication Data

US 2013/0124958 A1 May 16, 2013

(51) Int. Cl.
G06F 17/22 (2006.01)
G06F 17/30 (2006.01)
G06T 11/20 (2006.01)
G06F 17/24 (2006.01)

(52) U.S. Cl.
CPC ...... *G06F 17/30696* (2013.01); *G06F 17/245* (2013.01); *G06F 17/30657* (2013.01); *G06T 11/206* (2013.01)

(58) Field of Classification Search
None
See application file for complete search history.

(56) References Cited

U.S. PATENT DOCUMENTS

| 5,461,708 | A | * | 10/1995 | Kahn | 345/440 |
| 5,544,267 | A | * | 8/1996 | Mahoney et al. | 382/317 |
| 5,752,025 | A | * | 5/1998 | Shakib et al. | |
| 6,411,959 | B1 | | 6/2002 | Kelsey | |
| 6,529,217 | B1 | * | 3/2003 | Maguire et al. | 715/769 |
| 6,565,610 | B1 | | 5/2003 | Wang et al. | |
| 6,728,724 | B1 | * | 4/2004 | Megiddo et al. | |
| 6,831,668 | B2 | * | 12/2004 | Cras et al. | 715/853 |
| 6,900,807 | B1 | * | 5/2005 | Liongosari | G06F 17/30011 345/440 |
| 6,900,808 | B2 | * | 5/2005 | Lassiter et al. | 345/440 |
| 6,906,717 | B2 | * | 6/2005 | Couckuyt et al. | 345/440 |
| 6,972,762 | B2 | * | 12/2005 | Ben-Tovim et al. | 345/440 |
| 6,976,086 | B2 | * | 12/2005 | Sadeghi et al. | 709/236 |

(Continued)

OTHER PUBLICATIONS

"International Search Report", Mailed Date: Mar. 15, 2013, Application No. PCT/US2012/064253, Filed Date: Nov. 9, 2012, pp. 8.

(Continued)

*Primary Examiner* — Maikhanh Nguyen
(74) *Attorney, Agent, or Firm* — Fiala & Weaver P.L.L.C.

(57) ABSTRACT

Methods, systems, and computer program products are provided for automatically enriching data in tables of report documents. A table of data contained in a document is received. A category of data stored in a column of the table of data is determined Enhancement information associated with the determined category is retrieved. The enhancement information may include visual enhancements (e.g., symbols, images, etc.) and/or may include reference data that is related to the determined category of column data. A user is enabled to select enhancement information of the retrieved enhancement information. The selected enhancement information is displayed in the document. The user is enabled to accept the selected enhancement information to be stored in the document.

20 Claims, 11 Drawing Sheets

(56) References Cited

U.S. PATENT DOCUMENTS

| | | | |
|---|---|---|---|
| 6,995,768 B2* | 2/2006 | Jou ........................ G06F 9/542<br>345/440 |
| 7,002,580 B1* | 2/2006 | Aggala ................. G06T 11/206<br>345/440 |
| 7,015,911 B2* | 3/2006 | Shaughnessy ........ G06F 17/243<br>345/440 |
| 7,155,665 B1* | 12/2006 | Browne et al. ............... 715/243 |
| 7,216,116 B1* | 5/2007 | Nilsson et al. |
| 7,292,244 B2 | 11/2007 | Vafiadis et al. |
| 7,302,444 B1* | 11/2007 | Dunmore et al. |
| 7,546,522 B2* | 6/2009 | Tolle ..................... G06F 17/211<br>715/201 |
| 7,548,912 B2* | 6/2009 | Gideoni et al. |
| 7,583,266 B2* | 9/2009 | Ben-Tovim ........... G06T 11/206<br>345/440 |
| 7,606,835 B2 | 10/2009 | Laaser et al. |
| 7,636,709 B1* | 12/2009 | Srikant et al. |
| 7,667,582 B1* | 2/2010 | Waldorf ........................ 340/440 |
| 7,698,287 B2* | 4/2010 | Becker et al. .......... 707/999.101 |
| 7,752,068 B1* | 7/2010 | Micklavzina et al. ....... 705/7.37 |
| 7,840,896 B2* | 11/2010 | Tien ....................... G06Q 10/10<br>715/243 |
| 7,870,016 B2* | 1/2011 | Fazal ................. G06Q 10/0637<br>705/7.36 |
| 7,870,476 B2* | 1/2011 | Dorwart ................ G06F 17/246<br>715/200 |
| 7,949,953 B2* | 5/2011 | Bhatt et al. .................... 715/771 |
| 7,961,188 B2* | 6/2011 | Tolle ..................... G06T 11/206<br>345/440 |
| 7,999,809 B2* | 8/2011 | Beers et al. ................... 345/440 |
| 8,190,992 B2* | 5/2012 | Tien ....................... G06Q 30/00<br>715/243 |
| 8,294,715 B2* | 10/2012 | Patel ..................... G06T 11/206<br>345/440 |
| 8,520,000 B2* | 8/2013 | Duncker ........... G06F 17/30873<br>345/418 |
| 9,058,307 B2* | 6/2015 | Tien ....................... G06F 17/21 |
| 2001/0049695 A1 | 12/2001 | Chi et al. |
| 2002/0118192 A1* | 8/2002 | Couckuyt et al. ............. 345/440 |
| 2003/0071814 A1* | 4/2003 | Jou ........................ G06F 9/542<br>345/440 |
| 2003/0212960 A1 | 11/2003 | Shaughnessy et al. |
| 2003/0218611 A1* | 11/2003 | Ben-Tovim et al. ......... 345/440 |
| 2004/0252136 A1* | 12/2004 | Bhatt et al. .................... 345/619 |
| 2005/0035967 A1* | 2/2005 | Joffrain et al. ............... 345/440 |
| 2006/0022981 A1* | 2/2006 | Ben-Tovim ........... G06T 11/206<br>345/440 |
| 2006/0075328 A1 | 4/2006 | Becker et al. |
| 2006/0112123 A1* | 5/2006 | Clark et al. .................... 707/101 |
| 2006/0136819 A1* | 6/2006 | Tolle ..................... G06F 17/211<br>715/235 |
| 2007/0055688 A1* | 3/2007 | Blattner ............ G06F 17/30569 |
| 2007/0126736 A1* | 6/2007 | Tolle ..................... G06Q 10/10<br>345/440 |
| 2007/0143175 A1* | 6/2007 | Tien ................. G06Q 10/06393<br>705/7.39 |
| 2007/0174255 A1 | 7/2007 | Sravanapudi et al. |
| 2007/0226190 A1* | 9/2007 | Lorenzen .......... G06F 17/30905 |
| 2007/0226614 A1 | 9/2007 | Lorenzen et al. |
| 2007/0239508 A1* | 10/2007 | Fazal ................. G06Q 10/0637<br>705/7.36 |
| 2007/0239660 A1* | 10/2007 | Tien ....................... G06Q 10/10 |
| 2007/0250523 A1* | 10/2007 | Beers et al. ................... 707/101 |
| 2007/0260625 A1* | 11/2007 | Tien ....................... G06Q 30/00 |
| 2007/0260970 A1* | 11/2007 | Dorwart ............... G06F 17/246 |
| 2007/0294631 A1* | 12/2007 | Wiseman ...................... 715/764 |
| 2008/0184099 A1* | 7/2008 | Tien ....................... G06F 17/21<br>715/209 |
| 2008/0288889 A1* | 11/2008 | Hunt et al. .................... 715/810 |
| 2009/0100370 A1* | 4/2009 | Martone et al. ............... 715/777 |
| 2009/0300524 A1 | 12/2009 | Carlson et al. |
| 2010/0214299 A1* | 8/2010 | Robertson ............... G06T 13/80<br>345/440 |
| 2010/0293162 A1* | 11/2010 | Odland et al. ................. 707/736 |
| 2011/0271172 A1* | 11/2011 | Radakovitz ........... G06F 17/246<br>715/212 |

OTHER PUBLICATIONS

"Tips & Tricks: GoogleLookup in Google spreadsheets," Docs Blog, Google Inc. downloaded from http://googledocs.blogspot.com/2010/07/tips-tricks-googlelookup-in-google.html on May 24, 2013, document dated Jul. 26, 2010, 5 pages.

David Barkaway, "SAS® Data Management Platform," SAS Technology Practice, SAS Institute, Inc., downloaded from http://www.sas.com/offices/europe/austria/html/events/bab/bab10_downloads/bab10_david_barkaway.pdf on May 24, 2013, document dated 2010, 35 pages.

Syed, et al., "Automatic Discovery of Semantic Relations using MindNet", Retrieved at <<http://ebiquity.umbc.edu/_file_directory_/papers/482.pdf>>, Proceedings of the Seventh International Conference on Language Resources and Evaluation, 2010, pp. 8.

Mackinlay, et al., "Show Me: Automatic Presentation for Visual Analysis", Retrieved at <<http://ieeexplore.ieee.org/stamp/stamp.jsp?tp=&arnumber=4376133>>, IEEE Transactions on Visualization and Computer Graphics, vol. 13, No. 6, Nov./Dec. 2007, pp. 1137-1144.

Keim, Daniel A., "Information Visualization and Visual Data Mining", Retrieved at <<http://ieeexplore.ieee.org/stamp/stamp.jsp?tp=&arnumber=981847>>, IEEE transactions on visualization and computer graphics, vol. 7, No. 1, Jan.-Mar. 2002, pp. 100-107.

Kalantari, et al., "Automatic Spatial Metadata Enrichment: Reducing Metadata Creation Burden through Spatial Folksonomies", Retrieved at <<http://www.csdila.unimelb.edu.au/publication/conferences/GSDI-12/Automatic%20Spatial%20Metadata%20Enrichment%20Reducing%20Metadata%20Creation%20Burden%20through%20Spatial%20Folksonomies.pdf>>, Proceedings of the GSDI 12 World Conference: Realising Spatially Enabled Societies, Nov. 2005, pp. 11.

Second Office Action and Search Report Issued in Chinese Patent Application No. 201210461614.0, Mail Date: Jul. 7, 2015, 16 Pages.

Supplementary Search Report Received for European Patent Application No. 12849594.2, Mail Date: May 21, 2015, 7 Pages.

Mueller, Jennifer M., "Work Smarter With Smart Tags", In Proceedings of Journal of Accountancy Online Issues, Nov. 1, 2002, pp. 1-9.

Third Office Action Issued in Chinese Patent Application No. 201210461614.0, Mailed Date: Dec. 30, 2015, 13 Pages.

First Office Action and Search Report Issued in Chinese Patent Application No. 201210461614.0, Mail Date: Dec. 9, 2014, 16 Pages.

* cited by examiner

600

602

| 0 | A | B | C | D | E | F |
|---|---|---|---|---|---|---|
| 1 | Title | Hire Date | Gender | Country | Car Color | Car Make |
| 2 | Designer | 5/11/02 | Male | US | Yellow | Honda |
| 3 | Engineer | 3/20/01 | Male | US | Red | Ford |
| 4 | VP | 8/6/97 | Female | CA | Blue | GM |
| 5 | Engineer | 4/29/09 | Male | US | Red | GM |
| 6 | Prod Eng | 2/12/01 | Female | UK | Blue | Ford |
| 7 | Designer | 7/21/03 | Female | US | Blue | Acura |
| 8 | Marketer | 12/8/01 | Female | FR | Yellow | Chrysler |
| 9 | Engineer | 1/30/07 | Male | UK | Red | Ford |

| | A | B | C | D | E | F |
|---|---|---|---|---|---|---|
| 0 | | | | | | |
| 1 | Title | Hire Date | Gender | M/F Symbol | Country | Car Color |
| 2 | Designer | 5/11/02 | Male | ♂ | US | Yellow |
| 3 | Engineer | 3/20/01 | Male | ♂ | US | Red |
| 4 | VP | 8/6/97 | Female | ♀ | CA | Blue |
| 5 | Engineer | 4/29/09 | Male | ♂ | US | Red |
| 6 | Prod Eng | 2/12/01 | Female | ♀ | UK | Blue |
| 7 | Designer | 7/21/03 | Female | ♀ | US | Blue |
| 8 | Marketer | 12/8/01 | Female | ♀ | FR | Yellow |
| 9 | Engineer | 1/30/07 | Male | ♂ | UK | Red |

| | 608a | 608b | 608c | 608d | 1204 | 608e |
|---|---|---|---|---|---|---|
| 0 | A | B | C | D | E | F |
| 1 | Title | Hire Date | Gender | Country | C. Flag | Car Color |
| 2 | Designer | 5/11/02 | Male | US | | Yellow |
| 3 | Engineer | 3/20/01 | Male | US | | Red |
| 4 | VP | 8/6/97 | Female | CA | | Blue |
| 5 | Engineer | 4/29/09 | Male | US | | Red |
| 6 | Prod Eng | 2/12/01 | Female | UK | | Blue |
| 7 | Designer | 7/21/03 | Female | US | | Blue |
| 8 | Marketer | 12/8/01 | Female | CA | | Yellow |
| 9 | Engineer | 1/30/07 | Male | UK | | Red |

1302 — enable at least a portion of the reference data to be displayed in the table

600

602

| 0 | A | B | C | D | E | F |
|---|---|---|---|---|---|---|
| 1 | Title | Hire Date | Gender | Country | Population | Car Color |
| 2 | Designer | 5/11/02 | Male | US | 312,452,000 | Yellow |
| 3 | Engineer | 3/20/01 | Male | US | 312,452,000 | Red |
| 4 | VP | 8/6/97 | Female | CA | 34,620,000 | Blue |
| 5 | Engineer | 4/29/09 | Male | US | 312,452,000 | Red |
| 6 | Prod Eng | 2/12/01 | Female | UK | 62,435,709 | Blue |
| 7 | Designer | 7/21/03 | Female | US | 312,452,000 | Blue |
| 8 | Marketer | 12/8/01 | Female | CA | 34,620,000 | Yellow |
| 9 | Engineer | 1/30/07 | Male | UK | 62,435,709 | Red |

Column headers: 608a, 608b, 608c, 608d, 1404, 608e — 1402

ENRICHMENT OF DATA USING A SEMANTIC AUTO-DISCOVERY OF REFERENCE AND VISUAL DATA

BACKGROUND

An organization, such as a corporation, a partnership, or other business, may generate and/or otherwise accumulate a large body of data, information, and knowledge. Such data, information, and knowledge may be referred to as corporate data. Corporate data may contain text, codes, numbers, and other information. Persons at such organizations may find it useful at times to organize and present such corporate data to entities in reports. Various applications may be used to generate reports based on corporate data, including spreadsheet tools such as Microsoft Excel® (developed by Microsoft Corp. of Redmond, Wash.), Google Spreadsheet of Google Docs™ (developed by Google Inc. of Mountain View, Calif.), and IBM Lotus Symphony Spreadsheets (developed by IBM Corporation of Armonk, N.Y.), reporting services such as SQL Server Reporting Services (developed by Microsoft Corporation), Crystal Reports™ (developed by SAP Business Objects of San Jose, Calif. and Paris, France), and Oracle® Reports (developed by Oracle Corporation of Redwood City, Calif.), and business intelligence clients (e.g., IBM Cognos Oracle® Hyperion, and SAP Business Objects™).

Problems exist with reports that are generated based on corporate data. Such reports may be visually dull, as they primarily show columns of raw data. Furthermore, such reports may be difficult to be searched by a user to visually locate relevant data (e.g., a user may have to read/scan all the text of the report), and may not be memorable to users when such reports lack visuals and/or further descriptive information. As such, reports based on corporate data typically lack richness and have limited usage.

Currently, generators of reports can manually add visuals and further data to reports. However, this adding is a long and tedious manual process. Google Spreadsheet includes a feature called "Google Lookup" to add data to a report. However, in order to do so, Google Spreadsheet causes the user to explicitly build a query to obtain the data, and to manually attach the query to the spreadsheet.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for automatically enriching data in tables of report documents. For instance, enrichments may be added to a report based on automatic detection of data in columns of a table of the report. Based on the detected column data, enrichments may be retrieved from local and/or remote sources. Examples of such enrichments include visual enrichments, reference data, geographical enrichments that enable spatial reports to be generated, etc. The enrichments may be added to existing columns of the table and/or to new columns of the table to enhance the table. Furthermore, graphs and other graphical representations may be generated based on the enhanced table that may display the visual enrichments (e.g., "infographics" may be generated, which are graphic visual representations of information, data, or knowledge).

In one method implementation, a table of data contained in a document is received. A category of data stored in a column of the table of data is determined Enhancement information associated with the determined category is retrieved. The enhancement information may include visual enhancements (e.g., symbols, images, etc.) and/or may include reference data that is related to the determined category of column data. A user is enabled to select at least some of the retrieved enhancement information. The selected enhancement information is displayed in the document. The user is enabled to accept the selected enhancement information to be stored in the document, if desired.

In a system implementation, a data enhancement system includes a column analyzer (optional), an enhancement retriever, a user interface module (optional), and a column modifier. The column analyzer determines a category of data stored in a column of a table contained in a document. The column analyzer is configured to compare the data of the column with a plurality of stored data sets to determine the category of data. The stored data sets correspond to a plurality of data categories. The enhancement retriever retrieves enhancement information for the column that is associated with the determined category. The user interface module provides a user interface that enables a user to select at least some of the enhancement information of the retrieved enhancement information. The column modifier enables the selected enhancement information to be displayed in the document.

Computer program products are also described herein for automatically enriching table data, as well as for enabling additional embodiments.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 6 shows an example table in a spreadsheet editor tool window, according to an embodiment.

FIG. 11 shows the example window of FIG. 6, where selected enhancement data is included in an existing column and a new column of a table, according to an embodiment.

FIG. 12 shows the example window of FIG. 6, where images that are selected as enhancement data are included in a new column of a table, according to an embodiment.

Figure 1:
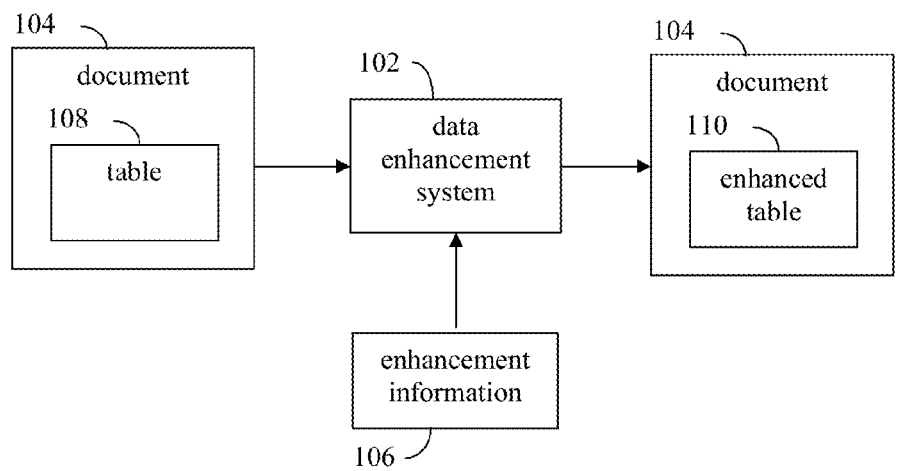
FIG. 1 shows a block diagram of a data enhancement environment that includes a data enhancement system used to automatically enhance data in a table, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It noted that any section/subsection headings provided herein are not intended to be limiting. Embodiments are described throughout this document, and any type of embodiment may be included under any section/subsection.

II. Example Embodiments

Problems exist with reports that are generated based on corporate data. Such reports may be visually dull, may be difficult to be searched by a user to visually locate relevant data (e.g., a user may have to read/scan all the text of the report), and may not be memorable to users when such reports lack visuals (such as images). Furthermore, such reports do not typically contain reference data. Reference data is defined as additional data that is obtained for existing table column data, is associated with a category of the column data, and is typically more specific (less broad) than the column data. For instance, a category of data in a column of a table may be "automobiles". Examples of reference data for "automobiles" may include "car models", "car manufacturers", "car colors", etc. Techniques for generating reports based on corporate data are not capable of automatically adding such reference data to the reports. As such, for all of these reasons, reports based on corporate data typically lack richness and have limited usage. Currently, generators of reports can manually add visual entities and reference data to the reports. However, such adding of visual entities and reference data is a long and tedious manual process.

Embodiments provide automatic data enrichment techniques for reports. For instance, in an embodiment, enrichments may be added to report data based on automatic semantic detection of values in columns of a table of the report. Examples of such enrichments include visual enrichments (e.g., images, symbols, colors, font sizes, font types, etc.), attributes enrichments (the addition of reference data, the sizing and/or other modifying of visual enrichments based on values of numerical reference data, etc.), geographical enrichments (e.g., adding geo data, such as polygons, a center point, etc.) that enable spatial reports to be generated, etc. In embodiments, such enrichment may be performed on any one or more levels of business intelligence. For instance, the enrichment may be performed using reporting tools (e.g., spreadsheet tools such as Microsoft Crescent, Microsoft Excel®, Google Spreadsheet of Google Docs™, IBM Lotus Symphony Spreadsheets, Microsoft SSRS (SQL Server Reporting Services), reporting services such as SQL Server Reporting Services, Crystal Reports™, and Oracle® Reports, and business intelligence clients such as IBM Cognos®, Oracle® Hyperion, and SAP Business Objects™ etc.), using data modeling such as BISM (Business Intelligence Semantic Model), the Microsoft Power-Pivot add-on to Microsoft Excel, etc., and/or using data extraction, transformation, and loading (ETL), such as through Microsoft SSIS (SQL Server Integration Services)/DQS (data quality services).

In an embodiment, auto-discovery logic may determine that a column contains a particular semantic content, such as by determining that the set of its values is a subset of a known categorized data set (e.g. CA, WA, and NJ is a subset of the fifty known US state codes). The auto-discovery logic may perform matching, which may or may not need to find an exact match (e.g., the auto-discovery logic may be resilient to typographical errors and/or unknown values). Various matching techniques may be used, such as accessing dictionary data structures, using SQL (structured query language) by performing an inner join on a temporary table, performing network searches (e.g., searching over the Internet), using DQS-like logic, people pictures from address book, etc.

Embodiments may be implemented in a variety of environments. For instance, FIG. 1 shows a block diagram of a data enhancement environment 100 that includes a data enhancement system 102 used to automatically enhance data in tables, according to an example embodiment. As shown in FIG. 1, data enhancement system 102 receives a table 108, which may optionally be contained in a document 104 (e.g., a spreadsheet document, a word processing document, or other type of document that may contain a table) or other data structure. Data enhancement system 102 analyzes one or more columns of table 108 to determine one or more categories of data contained by the one or more columns. Data enhancement system 102 retrieves enhancement information 106 based on the determined one or more column data categories. Data enhancement system 102 enhances table 108 by including enhancements included in enhancement information 106 in table 108 to generate enhanced table 110 (shown included in document 104 in the example of FIG. 1). Enhanced table 110 includes one or more enhancements relative to table 108, which may be one or more of visual enhancements and/or reference data. Such enhancements may be included in existing and/or new columns of enhanced table 110.

Figure 2:
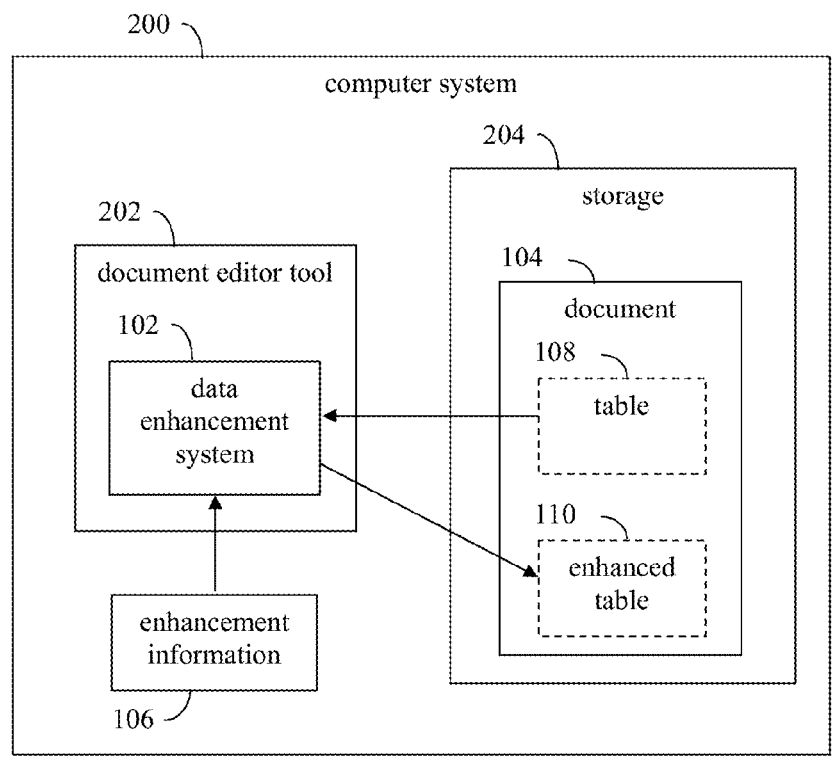
FIG. 2 shows a block diagram of a computer system containing a document editor tool configured to enhance data in a table, according to an example embodiment.

Environment 100 of FIG. 1 may be configured in various ways, in embodiments. For instance, FIG. 2 shows a block diagram of a document editor tool 202 implemented in a computer system 200, according to an example embodiment. Document editor tool 202 is configured to automatically enhance data in tables. As shown in FIG. 2, computer system 200 includes document editor tool 202 and storage 204. Furthermore, document editor tool 202 contains data enhancement system 102. Document editor tool 202 may be a commercially available document editor (e.g., a spreadsheet editor tool such as Microsoft Crescent, Microsoft Excel®, Google Spreadsheet of Google Docs™, and IBM Lotus Symphony Spreadsheets, a word processing tool such as Microsoft® Word, etc.), a proprietary document editor, or other tool that enables human readable tabular data to be viewed and/or edited, including any other document editing tool or system mentioned elsewhere herein or otherwise known. Data enhancement system 102 may be built into document editor 202 (e.g., in the form of program code, etc.) or may be coupled to document editor 202, such as in the form of an add-on or plug-in module. Data enhancement system 102 provides automatic data enhancement functionality to document editor tool 202, as described herein.

As shown in FIG. 2, document editor tool 200 accesses storage 204 to retrieve document 104 (or other data structure that includes table 108). Document editor tool 202 receives enhancement information 106, which may be stored locally to computer system 200 (e.g., in storage 204 or other local storage) and/or may be accessed remotely from computer system 200. As shown in FIG. 2, document editor tool 202 stores enhanced table 110 in storage 204 (in document 104), when generated.

Storage 204 may include one or more of any type of storage mechanism to store data and/or code, including a magnetic disk (e.g., in a hard disk drive), an optical disc (e.g., in an optical disk drive), a magnetic tape (e.g., in a tape drive), a memory device such as a RAM device, a ROM device, etc., and/or any other suitable type of storage medium. Computer system 200 may be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a smart phone (e.g., an Apple iPhone, a Google Android™ phone, a Microsoft Windows® phone, etc.), or other type of computing device.

Note that FIG. 2 is provided for purposes of illustration, and in other embodiments, data enhancement system 102 may be implemented in other ways (e.g., separately from a document editor tool), as would be known to persons skilled in the relevant art(s) from the teachings herein.

Figure 3:
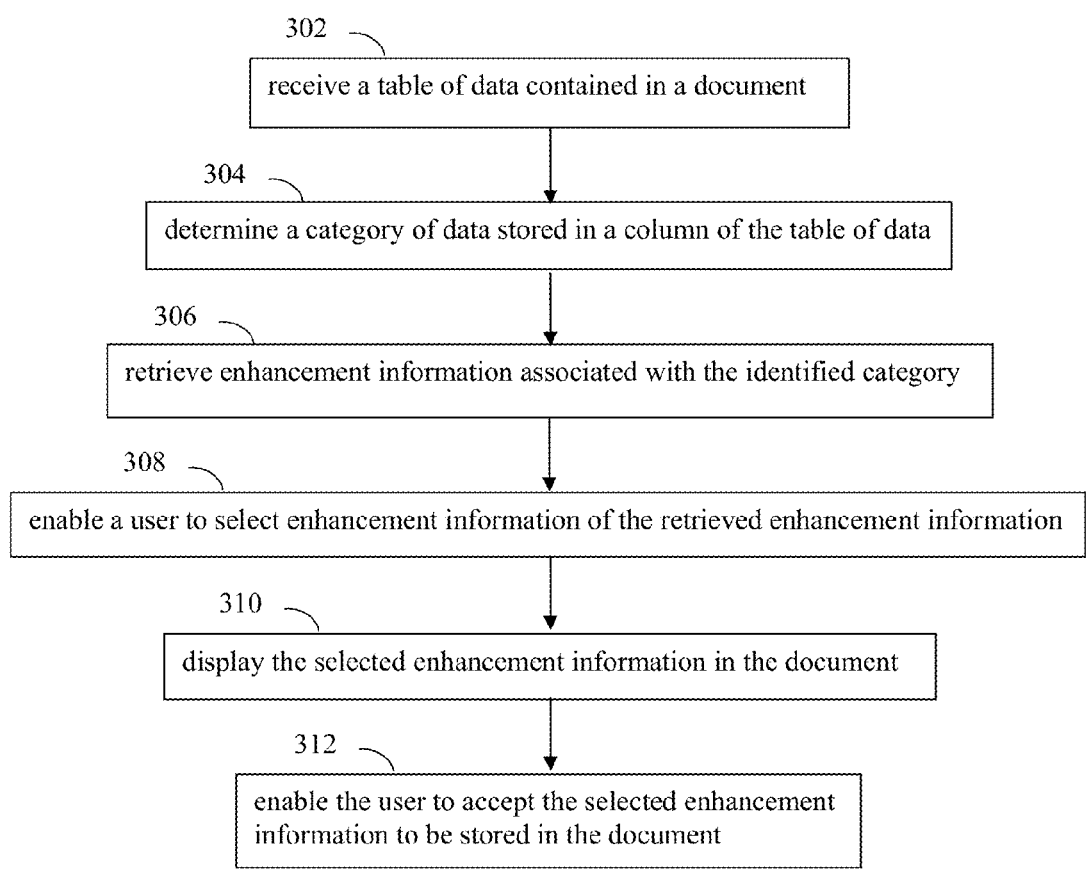
FIG. 3 shows a flowchart providing a process for automatically enhancing table data, according to an example embodiment.
Figure 4:
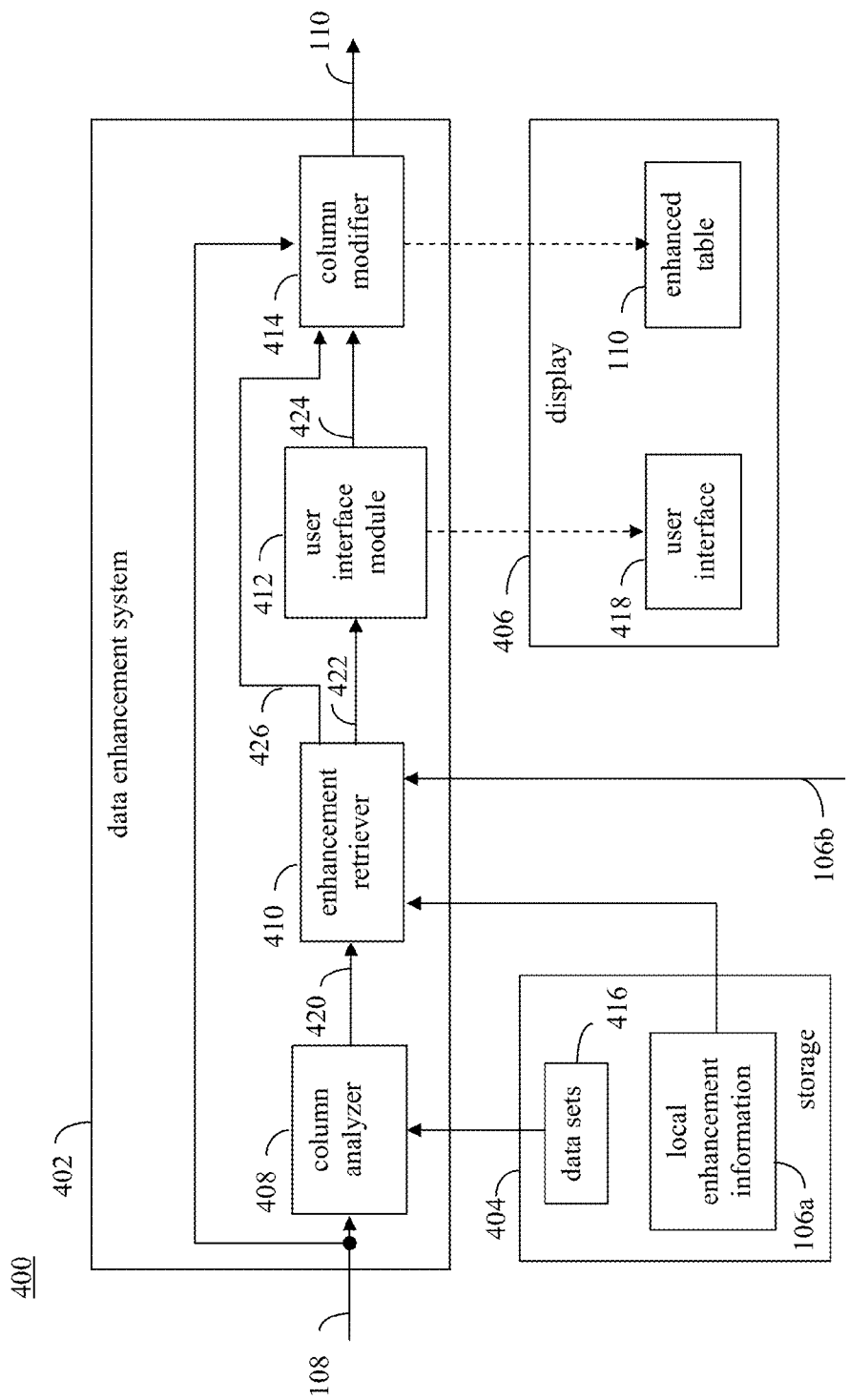
FIG. 4 shows a block diagram of a data enhancement system, according to an example embodiment.

Data enhancement system 102 may be configured to perform its functions in various ways. For instance, FIG. 3 shows a flowchart 300 providing a process for automatically enhancing table data, according to an example embodiment. In an embodiment, flowchart 300 may be performed by data enhancement system 102. Flowchart 300 is described as follows with reference to FIG. 4. FIG. 4 shows a block diagram of a computer system 400 that includes a data enhancement system 402, according to an example embodiment. As shown in FIG. 4, computer system 400 includes data enhancement system 402, storage 404, and a display 406. Computer system 400 is an example of computer system 200 of FIG. 2, and data enhancement system 402 is an example of data enhancement system 102. As shown in FIG. 4, data enhancement system 402 includes a column analyzer 408, an enhancement receiver 410, a user interface module 412, and a column modifier 414. Further structural and operational embodiments will be apparent to persons skilled in the relevant art(s) based on the following discussion regarding flowchart 300 and data enhancement system 402 of FIG. 4.

Flowchart 300 begins with step 302. In step 302, a table of data contained in a document is received. For example, as shown in FIG. 4, column analyzer 408 of data enhancement system 402 may receive table 108. Column analyzer 408 may receive table 108 directly, or may receive document 104 (FIG. 1) with table 108 included and may extract data of table 108 from document 104. Table 108 may include any number of rows and columns of data having any form (e.g., numerical data, string data, etc.).

In step 304, a category of data stored in a column of the table of data is determined. In an embodiment, column analyzer 408 is configured to analyze one or more columns of table 108 to determine categories of the data contained therein. For example, in an embodiment, column analyzer 408 may be configured to compare the data of a column of table 108 with a plurality of stored data sets 416 (e.g., stored in storage 404) to identify the category of the data contained in the column.

Data sets 416 are a plurality of sets of data that correspond to a plurality of data categories. Data sets 416 may include any number of data sets, including tens, hundreds, thousands, and even greater numbers of data sets. The data sets of data sets 416 may relate to any number of different data categories. Column analyzer 408 may compare the data of a column of table 108 to data sets 416 to identify a category of the column data. If the data of the column substantially matches data contained in a data set of data sets 416, column analyzer 408 may indicate that the data category of the matching data set is the category of the column. As shown in FIG. 4, column analyzer 408 outputs a determined category 420, which indicates the category determined for the data of the column. In some embodiments, a column may be categorized in multiple categories due to matching multiple data sets.

For instance, a first data set of data sets 416 may include one thousand persons names and may be a person's names category, a second data set of data sets 416 may include fifty U.S. state two digit state codes and may be a U.S. states category, and a third data set of data sets 416 may include one hundred names of foods and may be a food category. Column analyzer 408 may compare the data of one or more columns of table 108 to these three data sets to determine their respective categories. If a first column of table 108 includes the data values of MN, CA, VA, and WA, column analyzer 408 may determine that these data values match two digit state codes of the second data set, and therefore may indicate that this first column has a category of U.S. states. If a second column of table 108 includes the data values of John Smith, Jane Doe, William Jones, and Fred Jackson, column analyzer 408 may determine that these data values match names included in the first data set, and therefore may indicate that this second column has a category of person's names. This process may be performed for any number of one or more columns of table 108 to identify categories for the columns.

Note that in one embodiment, every data value included in a column of table 108 must be found in a data set to be assigned the category of the data set by column analyzer 408. In another embodiment, a predetermined percentage (e.g., 90%, 80%, 75%, etc.) of the data values included in a column of table 108 must be found in a data set to be assigned the category of the data set by column analyzer 408. Furthermore, in an embodiment, column analyzer 408 may be able to identify misspelled words (when words are present) in a column of table 108 (e.g., using a spell checker) so that the properly spelled words can be matched with data of data sets to enable improved accuracy in identifying categories for columns.

Note that in an embodiment, column analyzer 408 and enhancement retriever 410 may be combined together. In another embodiment, column analyzer 408 may not be present. In such an embodiment, a user may be enabled to manually determine the category of the data stored in the column of the table of data (in step 304). For example, in an embodiment, a user may be enabled to interact with a user interface to select a column of the table of data, and to indicate a column type for the selected column (e.g., country names, etc.). The user may be enabled to request that enrichments be retrieved for the selected column, or enrichments may be retrieved automatically for the selected column.

Referring back to FIG. 3, in step 306, enhancement information associated with the identified category is retrieved. For instance, in an embodiment, enhancement retriever 410 of FIG. 4 receives determined category 420 for a column of table 108. Enhancement retriever 410 may be configured to retrieve enhancement information (FIG. 1) based on determined category 420 for the column. In embodiments, enhancement retriever 410 may retrieve local enhancement information 106*a* stored locally to computer system 400 (e.g., in storage 404) and/or may retrieve remote enhancement information 106*b* that is stored remotely from computer system 400. As shown in FIG. 4, enhancement retriever 410 may generate received enhancement indication 422, which indicates one or more enhancements received in local enhancement information 106*a* and/or remote enhancement information 106*b*. For instance, received enhancement indication 422 may provide a list of received enhancements in the form of labels, titles, and/or other information that indicates the received enhancements.

For example, local enhancement information 106*a* stored in storage 404 may include data generated at computer system 400, data included in non-removable and/or removable storage, data loaded from removable storage, data downloaded from a network, etc. Any form of enhancement information may be included in local enhancement information 106*a*, including visual enhancements (e.g., symbols, images, videos, etc.) and reference data. Data of local enhancement information 106*a* may have any format and be stored in any manner in storage 404, including being basic data, generic keyword data (e.g., male/female, color names, etc.), common business vocabulary data (e.g., "Store", "On line", "Reseller", "New", "Used", "Refurbished", "High", "Low", "Planned", "Human Resources", "Management", "R&D", etc.), data based on international standards and statistics (e.g., countries (ISO 3166-1), states/regions (ISO 3166-2), currencies (ISO 4217), languages (ISO 639), United States census regions & locations, etc.), data cached on the client machine for easy discovery, etc.

Figure 5:
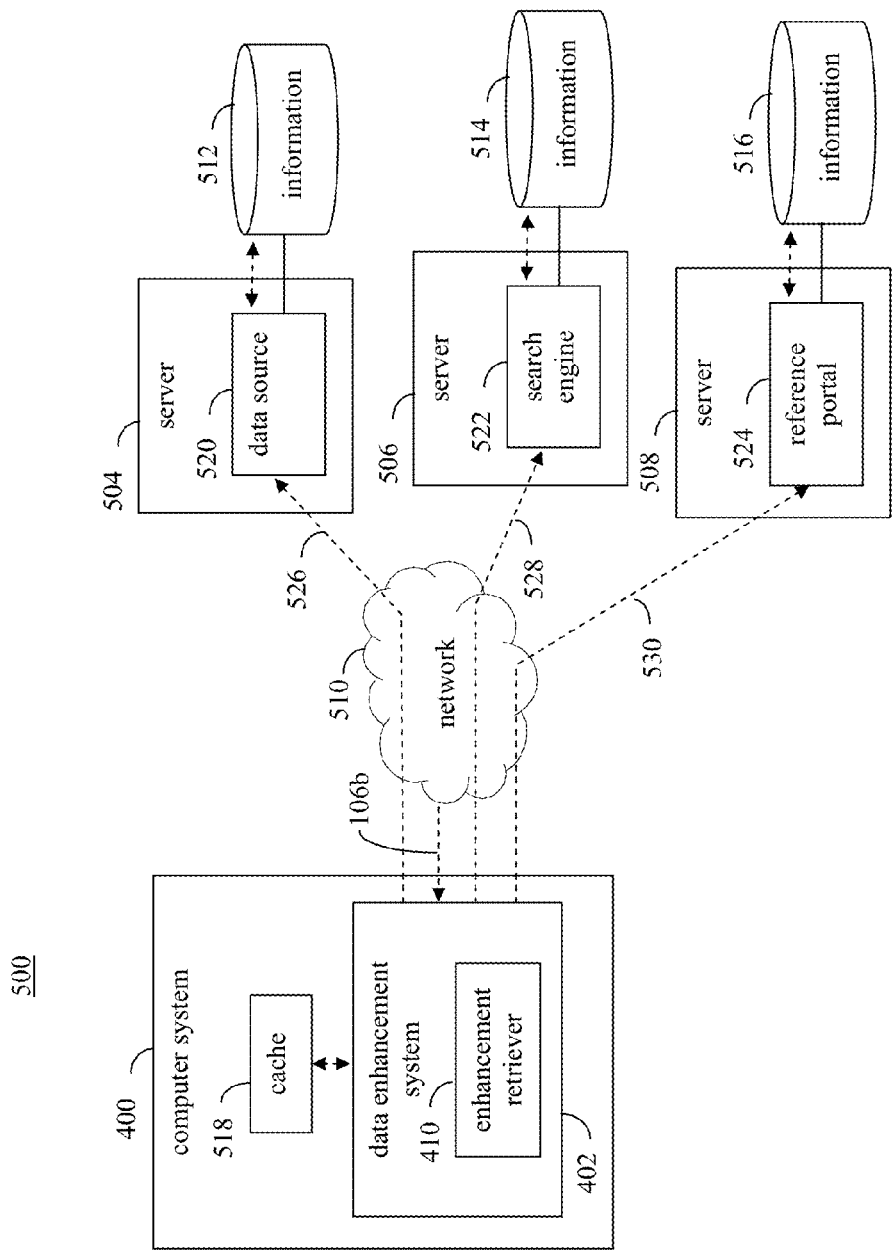
FIG. 5 shows a block diagram a data enhancement system that collects enhancement data from one or more remote sources, according to an example embodiment.

Remote enhancement information 106*b* retrieved from remote locations by enhancement retriever 410 may be retrieved from any location, including being retrieved from one or more computing devices over a network. For instance, FIG. 5 shows a block diagram of a communication system 500, where data enhancement system 402 in computer system 400 includes enhancement retriever 410, which collects enhancement data from one or more network-based locations, according to an example embodiment. As shown in FIG. 5, system 500 includes computer system 400, a first server 504, a second server 506, a third server 508, and a network 510. Any one or more of first-third servers 504, 506, and 508 may be present, in embodiments. System 500 is described as follows.

Computer system 400 and servers 504, 506, and 508 may be communicatively coupled in any manner, in a wired and/or wireless fashion, through network 510. For instance, computer system 400 and servers 504, 506, and 508 may be coupled together in a single cloud system that aggregates multiple data sources, or may be coupled together in other ways. Examples of network 510 include a LAN (local area network), a WAN (wide area network), or a combination of networks, such as the Internet. Examples of communication links that may be included in network 510 include IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB (universal serial bus) links, etc. Servers 504, 506, and 508 may each be any type of computing device described herein or otherwise known.

First server 504 includes a data source 520. Data source 520 may be any network-accessible source of information, including a data market where data sets may be shared and/or access to data may be purchased/leased. An example of such a data market accessible through network 510 is Microsoft Windows Azure™ Marketplace. Data source 502 may provide information in any form, including as stored data, data feeds, etc. As shown in FIG. 5, data enrichment system 402 may transmit a data request 526 to data source 520. Data request 526 may include one or more keywords for requested information, including providing the one or more data categories indicated in determined category 420 for a column as keywords. A schema may be defined that, according to which, data publishers may tag their data (e.g., tag their images, etc.) in information 512 so that their data may be provided in response to data requests. Data source 520 may access information 512 stored in storage local to first server 504 for the requested information (e.g., symbols, images, videos, reference data, etc.), and may provide the requested data to enhancement retriever 510 as remote enhancement information 106*b*.

Second server 506 includes a search engine 522. Search engine 522 may be any type of network-accessible search engine. Examples of search engine 522 that may be accessible through network 510 include, but are not limited to, Yahoo! Search™ (at http://www.yahoo.com), Microsoft Bing™ (at http://www.bing.com), and Google™ (at http://www.google.com). Search engine 522 may provide information in any form, including in results to a received search query. As shown in FIG. 5, data enrichment system 402 may transmit a search query 528 to search engine 522. Search query 528 may include one or more search keywords, including providing the one or more data categories indicated in determined category 420 as search keywords. Search engine 522 may access information 514 stored in storage local to second server 506 and/or at other network accessible location(s). Information 514 may include a variety of types of searchable information, such as entertainment related information (e.g., books, CD (compact discs), etc.), famous people, shopping, sports, technology, travel, stocks/companies, etc. For instance, information 514 may include web pages and other objects (e.g., symbols, images, videos, reference data, etc.) that were obtained by a web crawler searching the World Wide Web. Information 514 may use an index, a table, and/or other data structure to associate search keywords with related objects. In response to search query 528, search engine 522 may transmit or provide links to objects of information 514 to enhancement retriever 510 as remote enhancement information 106*b*.

Third server 508 includes an online/network-based reference portal 524. Reference portal 524 may be any type of network-accessible reference portal. Examples of reference portal 524 that may be accessible through network 510 include, but are not limited to, Wikipedia® (at http://www.wikipedia.com) supported by the Wikimedia Foundation, Inc. of San Francisco, Calif., The Encyclopaedia Britannica® (at http://www.britannica.com/) published by Encyclopaedia Britannica, Inc. of Chicago, Ill., etc. Reference portal 524 may provide information in any form, including in results to a received query. As shown in FIG. 5, data enrichment system 402 may transmit a query 530 to reference portal 524. Query 530 may include one or more keywords, including providing the one or more data categories indicated in determined category 420 as keywords. Reference portal 524 may access information 516 stored in storage local to third server 508 and/or at other network accessible location(s). For instance, reference portal 524 may provide one or more structured information boxes that contain data, images, etc., of information 514 that are provided in response to query 530. In response to query 530, reference portal 524 may transmit objects of information 516 to enhancement retriever 510 as remote enhancement information 106*b*.

Furthermore, as described above, enhancement retriever 410 may collect reference data. For instance, in an embodiment, storage 404 may include reference data in local enhancement information 106*a*. As described above, data sets 416 are a plurality of sets of data that correspond to a plurality of data categories. Local enhancement information 106*a* may include reference data for one or more of the data sets of data sets 416. For instance, local enhancement information 106*a* may include a map (e.g., a data structure) that maps categories (identified categories 420) to reference data sets in local enhancement information 106*a*. For instance, if a column category is determined to be U.S. states, a map included in local enhancement information 106*a* may map U.S. states to reference data sets, such as state population, state bird, dates that states were admitted to the union, etc. Enhancement retriever 410 may collect this reference data from local enhancement information 106*a* in storage 404. Additionally and/or alternatively, enhancement retriever 410 may collect reference data from remote sources (e.g., servers 504, 506, 508 of FIG. 5, etc.) in a similar fashion as for collecting reference data locally, or in a different manner, such as by performing queries (e.g., using keywords) to search for reference data related to identified categories of column data.

As shown in FIG. 5, computer system 400 may optionally include a cache 518. When present, cache 518 may be used to store received remote enhancement information 106*b*. Cache 518 may include one or more memory devices and/or other storage devices suitable for cache storage. Additionally and/or alternatively, received remote enhancement information 106*b* may be stored in longer term storage than cache 518.

Referring back to FIG. 3, in step 308, a user is enabled to select enhancement information of the retrieved enhancement information. For example, as shown in FIG. 4, user interface module 412 receives received enhancement indication 422, which indicates the enhancements received by enhancement retriever 410. In an embodiment, user interface module 412 is configured to generate a user interface 418 displayed by display 406 that displays the received enhancement indications, and enables a user to select one or more of the enhancements. For example, user interface 418 may be a graphical user interface (GUI) that provides one or more GUI elements, such as buttons, check boxes, pull down menus, text boxes, etc., that enable users to view and select enhancements. User interface 418 may be interacted with by a user through a keyboard, a thumb wheel, a pointing device, a roller ball, a stick pointer, a touch sensitive display, any number of virtual interface elements, a voice recognition system, etc. As shown in FIG. 4, user interface module 412 generates selected enrichment(s) indication 424, which indicates one or more enrichments selected by a user to be included in table 108.

For purposes of illustration, FIG. 6 shows a spreadsheet window 600 generated by a spreadsheet tool (e.g., document editor tool 202 of FIG. 2) and displayed by a display device (e.g., display 406 of FIG. 4). Spreadsheet window 600 is provided to show an example table 606. Table 606 is an example of table 108 (FIG. 1). The example of table 606 includes six columns 608*a*-608*f* and includes nine rows. First column 608*a* of table 606 includes "Title" data, second column 608*b* of table 606 includes "Hire Date" data, third column 608*c* of table 606 includes "Gender" data, fourth column 608*d* of table 606 includes "Country" data, fifth column 608*e* of table 606 includes "Car Color" data, and sixth column 608*f* of table 606 includes "Car Make" data. In embodiments, tables may include any number of columns and rows, and any type and quantity of data may be contained therein. The dimensions and contents of table 606 are provided herein for illustrative purposes.

As shown in FIG. 6, spreadsheet window 600 includes an enrichment request user interface element 602. Further user interface elements may also be displayed in spreadsheet window 600 to enable a user to interact with spreadsheets displayed therein, as would be known to persons skilled in the relevant art(s) (e.g., user interface elements that open documents, save documents, enable formatting and/or other editing of documents, change document views, etc.). For ease of illustration, such additional user interface elements are not shown in FIG. 6.

Enrichment request user interface element 602 may be any type of graphical user interface element, such as a button, a text entry box, a check box, a pull down menu, and/or any other suitable type of user interface element. A user of spreadsheet window 600 may interact with enrichment request user interface element 602 to have enrichment information retrieved for table 606 by scanning columns 608a-608f to identify them and find enrichments. For instance, flowchart 300 of FIG. 3 may be performed as a result of a user interacting with enrichment request user interface element 602 (e.g., by clicking on a button of user interface element 602 with a pointing device, etc.). User interface element 602 may display the text "Find Enrichment" or may provide other indication that notifies a user of its purpose. After steps 302, 304, and 306 are performed as described above with respect to table 606, user interface module 412 of FIG. 4 may generate user interface 418 to enable the user to select one or more located enrichments.

Figure 7:
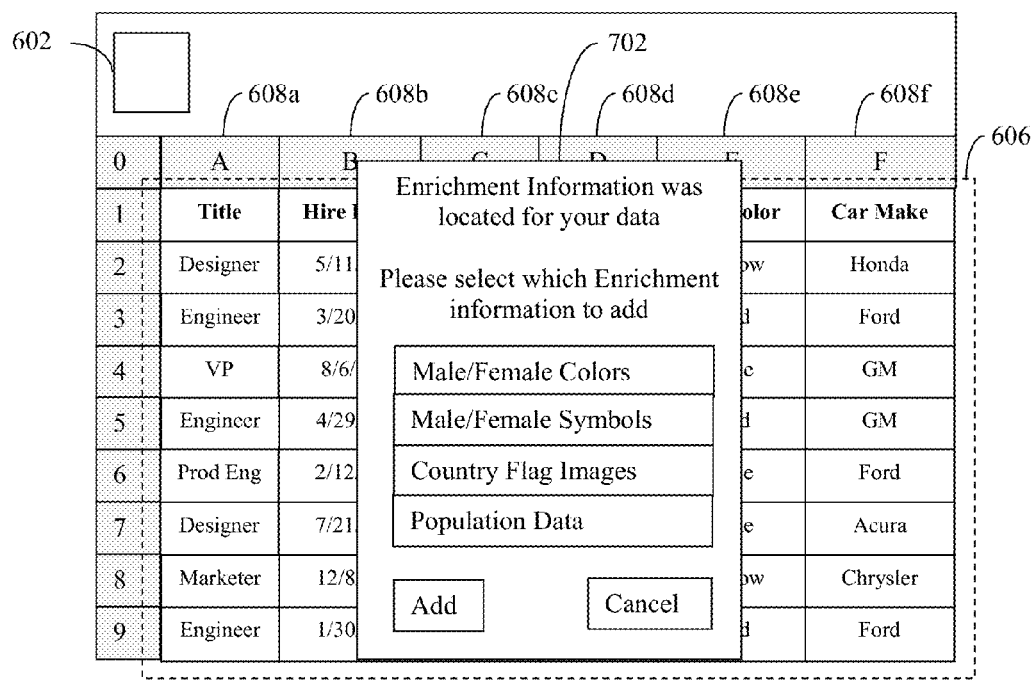
FIG. 7 shows the example window of FIG. 6, where a user interface is displayed that enables identified enhancement data to be added to the table, according to an embodiment.

For instance, FIG. 7 shows a user interface 702 displayed over window 600, according to an example embodiment. User interface 702 is an example graphical user interface that enables identified enhancement data to be added to table 606. For example, as indicated in user interface 702, four types of enrichment data were located for table 606. User interface 702 states that "Enrichment Information was located for your data", and requests a user to "Please select which Enrichment information to add." User interface 702 lists four types of enrichment data that can be added to table 606—"Male/Female Colors", "Male/Female Symbols", "Country Flag Images", and "Population Data". A user may select one or more of the listed four types of enrichment data in user interface 702, and may select an "Add" button (e.g., by mouse click) to add the selected enrichment data to table 606. Alternatively, the user may select the "Cancel" button to cancel adding any enrichment data to table 606 (e.g., to exit out of flowchart 300 of FIG. 3).

Note that the configuration of user interface 702 shown in FIG. 7 is provided as an example embodiment. In alternative embodiments, user interface 702 may include additional and/or alternative features. For instance, in an embodiment, user interface 702 may have one or more buttons (and/or other user interface elements) that a user can select to have additional and/or specific enrichment searches performed, such as a button indicating that a search may be performed in a specific data source, a button indicating that a search may be performed at a search engine, a button indicating that a search may be performed at a network-based reference portal, etc. When the button is selected, the corresponding enrichment search may be performed.

Note that user interface module 412 is optional. In another embodiment, enhancement information of the retrieved enhancement information may be selected automatically (e.g., by enhancement retriever 410 and/or by column modifier 414) instead of by a user in step 308. Furthermore, note that steps 304 and 308 of flowchart 300 may be performed together. For instance, a user may be enabled to determine a column category and select enhancement information in a single operation (e.g., select between "gender—icons" and "gender—colors" in the same operation, in a similar fashion as shown in FIG. 7). As such, in embodiments, step 304 can be performed before or after step 306.

Referring back to FIG. 3, in step 310, the selected enhancement information is displayed in the document. For example, as shown in FIG. 4, column modifier 414 receives table 108 and selected enrichment(s) indication 424, which indicates one or more enrichments selected by a user to be included in table 108. Furthermore, column modifier 414 receives selected enrichment information 426 from enhancement retriever 410. Selected enrichment information 426 includes the enrichment information received by enhancement retriever 410 that is indicated in selected enrichment(s) indication 424 for inclusion in table 108. Column modifier 414 is configured to modify one or more columns of table 108 so that the selected enhancement information is displayed in table 108.

Figure 8:
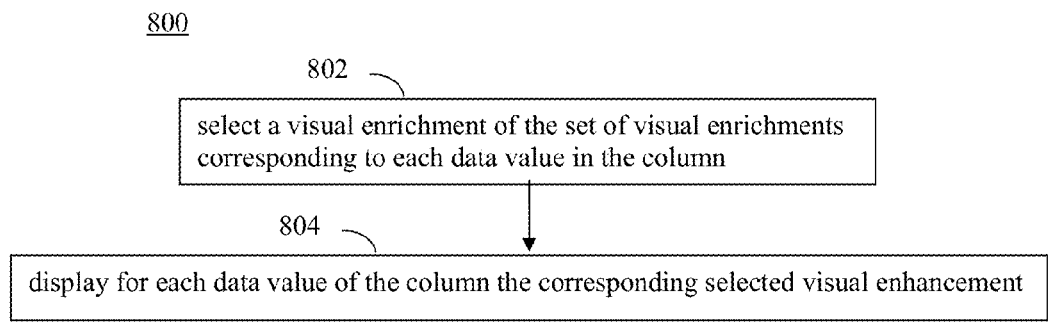
FIG. 8 shows a flowchart providing a process for displaying visual enrichments in a table, according to an example embodiment.

For instance, in one embodiment, the selected enrichment information may include one or more sets of visual enrichments, such as colors, symbols, images, videos, etc. In such an embodiment, a flowchart 800 shown in FIG. 8 may be performed. Flowchart 800 provides a process for displaying visual enrichments in a table, according to an example embodiment. Flowchart 800 may be performed for one or more columns of a table. Flowchart 800 is described as follows.

In step 802, a visual enrichment of the set of visual enrichments is selected corresponding to each data value in the column. For example, a column of a table may include different data values in different rows of the column, and a set of visual enrichments may have been selected for the column. Column modifier 414 may select a different visual enrichment from the set of visual enrichments for each different data value (e.g., a different color, a different symbol, a different image, etc.).

In step 804, the corresponding selected visual enhancement is displayed for each data value of the column. Column modifier 414 may be configured to display in table 108 the visual enhancement selected for each data value.

Figure 9:
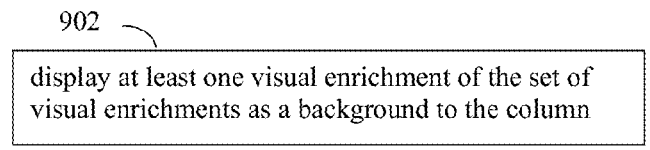
FIG. 9 shows a process for displaying visual enrichments in an existing column of a table, according to an example embodiment.

For instance, in one embodiment, column modifier 414 may display the visual enhancement selected for a data value in the column and row of the data value. For example, in an embodiment, column modifier 414 may perform a step 902 shown in FIG. 9. In step 902, at least one visual enrichment of the set of visual enrichments is displayed as a background to the column.

Figure 10:
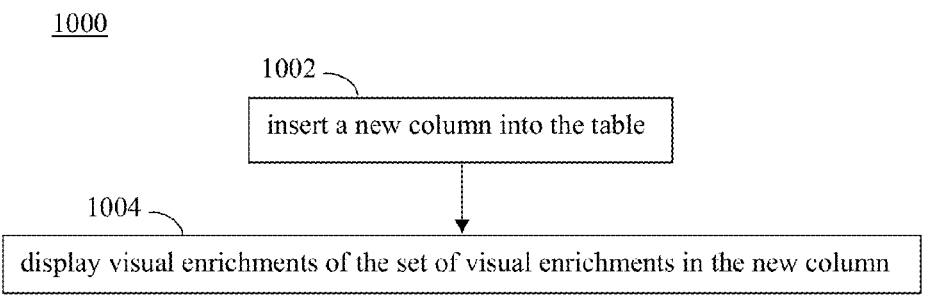
FIG. 10 shows a flowchart providing a process for displaying visual enrichments in a new column of a table, according to an example embodiment.

In another embodiment, column modifier 414 may display the visual enhancements selected for data values in a new column of the table. For example, in an embodiment, column modifier 414 may perform a flowchart 1000 shown in FIG. 10. In step 1002 of flowchart 1000, a new column is inserted into the table. In step 1004 of flowchart 1000, visual enrichments of the set of visual enrichments are displayed in the new column.

For instance, FIG. 11 shows window 600 of FIG. 6, where selected enhancement data is included in an enhanced table 1102, according to an embodiment. Referring to FIG. 7, a user interacting with window 600 may have selected to add "Male/Female Colors" and "Male/Female Symbols" to table 606. Enrichment retriever 410 may have obtained corresponding colors and/or symbols locally (e.g., as local enhancement information 106a) and/or remotely (e.g., as remote enhancement information 106b). Enhanced table 1102 of FIG. 11 is a modified form of table 606, with the received modifications incorporated therein according to step 902 of FIG. 9 (adding background color to a column) and according to flowchart 1000 (adding symbols to a new column).

As shown in FIG. 11, enhanced table 1102 includes columns 608a-608e of table 606 (column 608f is not visible in FIG. 11, but may be present at further right) and includes a new column 1104. Column 608c has been modified by column modifier 414 by adding color (shown in FIG. 11 as grayscale) to the background of column 608*c*. Each different data value of column 608*c* has been assigned a corresponding background color. For instance, for the data value of "Male" present in rows 2, 3, 5, and 9 of column 608*c*, the background of rows 2, 3, 5, and 9 in column 608*c* has been colored blue (shown as a first amount of grayscale shading). Additionally, for the data value of "Female" present in rows 4 and 6-8 of column 608*c*, the background of rows 4 and 6-8 in column 608*c* has been colored red (shown as a second amount of grayscale shading).

Furthermore, new column 1104 has been added between columns 608*c* and 608*d*. New column 1104 is labeled "M/F Symbol", and includes a male/female symbol for each corresponding data value in column 608*c*. For instance, for the data value of "Male" present in each of rows 2, 3, 5, and 9 of column 608*c*, column 1104 includes a male symbol in rows 2, 3, 5, and 9. Additionally, for the data value of "Female" present in rows 4 and 6-8 of column 608*c*, column 1104 includes a female symbol in each of rows 4 and 6-8.

In another example, FIG. 12 shows window 600 of FIG. 6, where selected enhancement data is included in an enhanced table 1202, according to an embodiment. For example, referring to FIG. 7, a user interacting with window 600 may have selected to add "Country Flag Images" to table 606. Enrichment retriever 410 may have obtained corresponding country flag images locally (e.g., as local enhancement information 106*a*) and/or remotely (e.g., as remote enhancement information 106*b*). Enhanced table 1202 of FIG. 12 is a modified form of table 606, with the received modifications incorporated therein according to flowchart 1000 (adding flag images to a new column).

As shown in FIG. 12, enhanced table 1202 includes columns 608*a*-608*e* of table 606 (column 608*f* is not visible in FIG. 12, but may be present at further right) and includes a new column 1204. New column 1204 has been added between columns 608*d* and 608*e*. New column 1204 is labeled "C. Flag", and includes a country flag image for each corresponding data value in adjacent column 608*d*. For instance, for the data value of "US" present in each of rows 2, 3, 5, and 7 of column 608*d*, column 1204 includes a United States flag image in rows 2, 3, 5, and 7. For the data value of "CA" present in each of rows 4 and 8 of column 608*d*, column 1204 includes a Canadian flag image in rows 4 and 8. Additionally, for the data value of "UK" present in rows 6 and 9 of column 608*d*, column 1204 includes a United Kingdom flag image in each of rows 6 and 9.

As such, column modifier 414 enables visual enhancements to be made to a table. Furthermore, reference data may be automatically collected and added to a table. For instance, in one embodiment, the enrichment information selected in step 308 of FIG. 3 may include one or more sets of reference data. Any type of reference data may be collected. For purposes of illustration, examples categories of data that may be present in a table are listed as follows, and corresponding examples of reference data sets that may be retrieved for them are also listed:

Countries and Territories (e.g., "Burkina Faso"): population, GDP (gross domestic product), capital city, largest city, etc.

U.S. States (e.g., "Tennessee" or "TN"): area, governor name, nickname, flower, etc.

Rivers (e.g., "Amazon River"): origin, length, etc.

Cities and Towns (e.g., "Chicago"): state, mayor name, elevation, etc.

Musicians (e.g., "John Lennon"): date of birth, place of birth, nationality, etc.

Actors (e.g., "Audrey Hepburn"): date of birth, place of birth, nationality, etc.

Politicians (e.g., "Anwar Al-Sadat"): date of birth, place of birth, nationality, etc.

U.S. Presidents (e.g., "Zachary Taylor"): date of birth, place of birth, political party, etc.

Baseball Players (e.g., "Wade Boggs"): games, at bats, earned run average (ERA), position, etc.

Chemical Elements (e.g., "Helium"): atomic number, discovered by, atomic weight, etc.

Chemical Compounds (e.g., "Isopropyl Alcohol"): chemical formula, melting point, boiling point, density, etc.

Stars (e.g., "Betelgeuse"): constellation, distance, mass, temperature, etc. Planets (e.g., "Saturn"): number of moons, length of day, distance from sun, atmosphere, etc.

Dinosaurs (e.g., "Velociraptor"): height, weight, when it lived, etc.

Ships (e.g., "USS Chesapeake"): length, displacement, complement, commissioned, etc.

Companies (e.g., "Hewlett-Packard"): employees, CEO (chief executive officer), ticker symbol, etc.

These examples of reference data sets are provided for purposes of illustration, and are not intended to be limiting.

Figures 13, 14, 15:
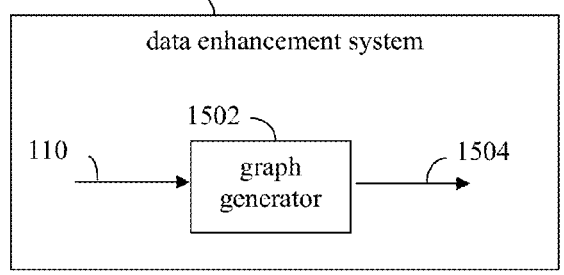
FIG. 13 shows a process for displaying reference data as identified enhancement data in a new column of a table, according to an example embodiment.
FIG. 14 shows the example window of FIG. 6, where selected enhancement data is included in a new column of a table, according to an embodiment.
FIG. 15 shows a block diagram a data enhancement system that includes a graph generator, according to an example embodiment.

In such an embodiment, a step 1302 shown in FIG. 13 may be performed. Step 1302 is a process for displaying reference data as identified enhancement data in a new column of a table, according to an example embodiment. Step 1302 may be performed for one or more columns of a table. In step 1302, at least a portion of the reference data is enabled to be displayed in the table. For example, in step 306 described above (FIG. 3), enhancement information that includes a reference data set may be retrieved for a column of table 108. The column may include different data values in different rows of the column. Column modifier 414 may select different reference data from the reference data set for each different data value (e.g., a different number of moons, a different state population, a different height, etc.). Column modifier 414 may be configured to display in table 108 the reference data selected for each data value.

For example, FIG. 14 shows window 600 of FIG. 6, where selected reference data is included in an enhanced table 1402, according to an embodiment. For example, referring to FIG. 7, a user interacting with window 600 may have selected to add "Population Data" to table 606. Enrichment retriever 410 may have obtained corresponding population data locally (e.g., as local enhancement information 106*a*) and/or remotely (e.g., as remote enhancement information 106*b*). Enhanced table 1402 of FIG. 14 is a modified form of table 606, with the received modifications incorporated therein according to step 1302 (adding population data to a new column).

As shown in FIG. 14, enhanced table 1402 includes columns 608*a*-608*e* of table 606 (column 608*f* is not visible in FIG. 14, but may be present at further right) and includes a new column 1404. New column 1404 has been added between columns 608*d* and 608*e*. New column 1404 is labeled "Population", and includes a population number for each corresponding data value in column 608*d*. For instance, for the data value of "US" present in each of rows 2, 3, 5, and 7 of column 608*d*, column 1404 includes a reference data value for the population of the United States of 312,452,000 in rows 2, 3, 5, and 7. For the data value of "CA" present in each of rows 4 and 8 of column 608*d*, column 1404 includes a reference data value for the population of Canada of 34,620,000 in rows 4 and 8. Additionally, for the data value of "UK" present in rows 6 and 9 of column 608*d*, column 1404 includes a reference data value for the population of the United of 62,435,709 in each of rows 6 and 9. Various further and/or alternative types of enhancement may be made to enhanced table 1402. For instance, another example of an enhancement to enhanced table 1402 is an additional column that includes circles or other shapes that have sizes proportional to the population number in the same row.

As such, in embodiments, visual enhancements and/or reference data may be added to a table in one or more existing and/or one or more additional columns. Any combination of visual enhancements and/or reference data may be added to a table with respect to any number of columns of the table. Such enhancement information may be visible when viewing the table in a document editor tool. By enabling tables to be generated that include visual enhancements and/or reference data, data enhancement system 402 provides enhancements/enrichment to reports that include tables. Note that in an embodiment, columns that are modified in a table and/or added to a table may be identified as having been enriched in a display window for the table (e.g., window 600), such as by displaying an enrichment icon above, below, or otherwise adjacent to the column and/or adjacent to a name of the column elsewhere in the document, etc.

Furthermore, in embodiments, one or more graphs may be generated based on the visual enhancements and/or reference data. For instance, FIG. 15 shows a block diagram of data enhancement system 402 including a graph generator 1502, according to an example embodiment. Graph generator 1502 enables a graph to be generated based on the visual enhancements and/or reference data added to a table.

For instance, as shown in FIG. 15, graph generator 1502 may receive enhanced table 110. A user may interact with a user interface generated by graph generator 1502 (and/or by the document editor tool) to select one or more columns of enhanced table 110 for graphing, or graph generator 1502 may automatically selected one or more columns of enhanced table 110 for graphing. As shown in FIG. 15, graph generator 1502 may generate graph data 1504, which may be displayed in a window as a graph by a display (e.g., display 406 of FIG. 4). One or more of the columns of enhanced table 110 may include reference data, and the graph may have one or more axes that correspond to the reference data columns, as well as to the original columns of table 108 that are contained in enhanced table 110. Furthermore, one or more visual enhancements that were retrieved may be displayed in the graph as plot points (e.g., flag images may be plotted as plot points in a graph that plots country population data (x-axis) versus country sales figures). As such, by generating graphs based on reference data, and enabling the graphs to include visual enhancements, graph generator 1502 enables data enhancement system 402 to provide even greater enhancements/enrichment to reports that include tables.

In step 312, the user is enabled to accept the selected enhancement information to be stored in the document. For example, as shown in FIG. 4, column modifier 110 generates enhanced table 110, and enhanced table 110 may be displayed by display 406. In an embodiment, the enhancements provided to table 110 by column modifier 110 may be automatically saved (e.g., in the source document 104). In another embodiment, a user may be enabled by the document editor tool to manually save document 104 with the enhancements to enhanced table 110. If the user elects to save document 104, document 104 may be saved to storage. Alternatively, the user may decide not to save document 104 with enhanced table 110, and/or may use an "undo" feature of other feature of the document editor tool to remove one or more of the enhancements.

III Example Computing Device Embodiments

Data enhancement system 102, data enhancement system 402, column analyzer 408, enhancement retriever 410, user interface module 412, column modifier 414, data source 520, search engine 522, reference portal 524, graph generator 1502, flowchart 300, flowchart 800, step 902, flowchart 1000, and step 1302 may be implemented in hardware, software, firmware, or any combination thereof. For example, data enhancement system 102, data enhancement system 402, column analyzer 408, enhancement retriever 410, user interface module 412, column modifier 414, data source 520, search engine 522, reference portal 524, graph generator 1502, flowchart 300, flowchart 800, step 902, flowchart 1000, and/or step 1302 may be implemented as computer program code configured to be executed in one or more processors. Alternatively, data enhancement system 102, data enhancement system 402, column analyzer 408, enhancement retriever 410, user interface module 412, column modifier 414, data source 520, search engine 522, reference portal 524, graph generator 1502, flowchart 300, flowchart 800, step 902, flowchart 1000, and/or step 1302 may be implemented as hardware logic/electrical circuitry. For instance, in an embodiment, one or more of data enhancement system 102, data enhancement system 402, column analyzer 408, enhancement retriever 410, user interface module 412, column modifier 414, data source 520, search engine 522, reference portal 524, graph generator 1502, flowchart 300, flowchart 800, step 902, flowchart 1000, and/or step 1302 may be implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 16:
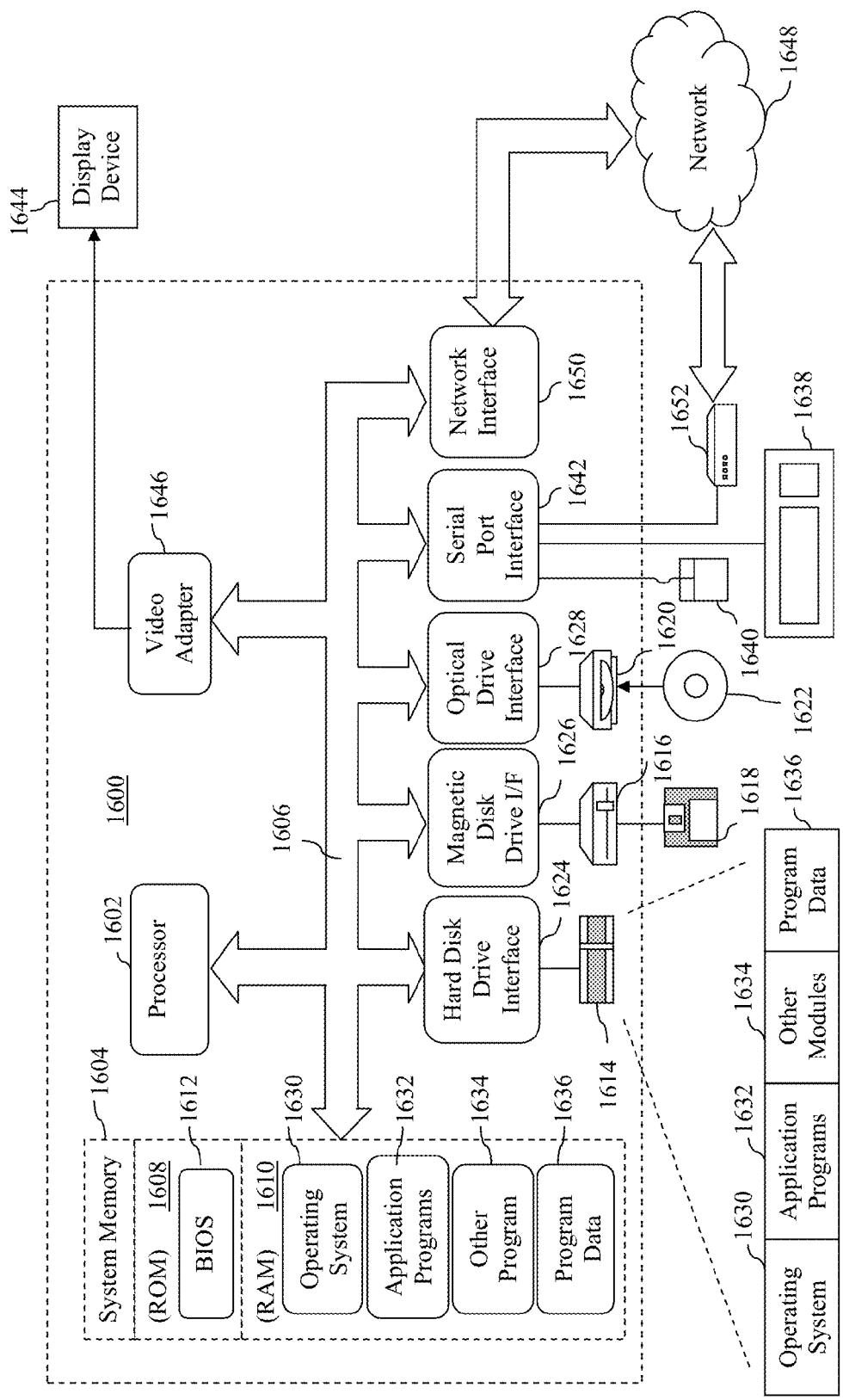
FIG. 16 shows a block diagram of an example computer that may be used to implement embodiments of the present invention.

FIG. 16 depicts an exemplary implementation of a computer 1600 in which embodiments of the present invention may be implemented. For example, computer system 200, computer system 400, server 504, server 506, and/or server 508 may be implemented in a computer system similar to computer 1600, including one or more features of computer 1600 and/or alternative features. Computer 1600 may be a general-purpose computing device in the form of a conventional personal computer, a mobile computer, a server, or a workstation, for example, or computer 1600 may be a special purpose computing device. The description of computer 1600 provided herein is provided for purposes of illustration, and is not intended to be limiting. Embodiments of the present invention may be implemented in further types of computer systems, as would be known to persons skilled in the relevant art(s).

As shown in FIG. 16, computer 1600 includes one or more processors 1602, a system memory 1604, and a bus 1606 that couples various system components including system memory 1604 to processor 1602. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random access memory (RAM) 1610. A basic input/output system 1612 (BIOS) is stored in ROM 1608.

Computer 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1630, one or more application programs 1632, other program modules 1634, and program data 1636. Application programs 1632 or program modules 1634 may include, for example, computer program logic (e.g., computer program code) for implementing data enhancement system 102, data enhancement system 402, column analyzer 408, enhancement retriever 410, user interface module 412, column modifier 414, data source 520, search engine 522, reference portal 524, graph generator 1502, flowchart 300, flowchart 800, step 902, flowchart 1000, and/or step 1302 (including any step of flowcharts 300, 800, and 1000), and/or further embodiments described herein.

A user may enter commands and information into the computer 1600 through input devices such as keyboard 1638 and pointing device 1640. Other input devices (not shown) may include a microphone, joystick, game pad, satellite dish, scanner, or the like. These and other input devices are often connected to processor 1602 through a serial port interface 1642 that is coupled to bus 1606, but may be connected by other interfaces, such as a parallel port, game port, or a universal serial bus (USB).

A display device 1644 is also connected to bus 1606 via an interface, such as a video adapter 1646. In addition to the monitor, computer 1600 may include other peripheral output devices (not shown) such as speakers and printers.

Computer 1600 is connected to a network 1648 (e.g., the Internet) through an adaptor or network interface 1650, a modem 1652, or other means for establishing communications over the network. Modem 1652, which may be internal or external, may be connected to bus 1606 via serial port interface 1642, as shown in FIG. 16, or may be connected to bus 1606 using another interface type, including a parallel interface.

As used herein, the terms "computer program medium," "computer-readable medium," and "computer-readable storage medium" are used to generally refer to media such as the hard disk associated with hard disk drive 1614, removable magnetic disk 1618, removable optical disk 1622, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1632 and other program modules 1634) may be stored on the hard disk, magnetic disk, optical disk, ROM, or RAM. Such computer programs may also be received via network interface 1650, serial port interface 1642, or any other interface type. Such computer programs, when executed or loaded by an application, enable computer 1600 to implement features of embodiments of the present invention discussed herein. Accordingly, such computer programs represent controllers of the computer 1600.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
   receiving a table of data contained in a document that is digital;
   determining, automatically and by using at least one processor, a category of data stored in a column of the table of data based on a semantic analysis of a plurality of data values corresponding to different rows of the column;
   retrieving, automatically and responsive to the determining, enhancement information associated with the determined category from a plurality of stored data sets based on the category of data that is determined, the enhancement information comprising one or more of visual enrichments, reference data, attributes enrichments, and geographic enrichments;
   displaying at least a portion of the enhancement information of the retrieved enhancement information in the table of data in the document; and
   providing an accept option and a reject option to a user and enabling the user to accept or reject the at least a portion of the enhancement information to be stored in the document by selecting the accept option or the reject option.

2. The method of claim 1, further comprising:
enabling the user to select enhancement information of the retrieved enhancement information.

3. The method of claim 1, wherein said determining further comprises:
comparing the data stored in the column with the plurality of stored data sets to determine the category of data, the stored data sets corresponding to a plurality of data categories.

4. The method of claim 1, wherein said retrieving comprises:
retrieving the enhancement information from at least one of a network-based data source, a search engine, or a network-based reference portal.

5. The method of claim 1, wherein the enhancement information is a set of visual enrichments associated with the determined category, wherein said displaying comprises:
displaying at least one visual enrichment of the set of visual enrichments in the table of data in the document.

6. The method of claim 5, wherein said displaying at least one visual enrichment of the set of visual enrichments in the table of data in the document comprises:
selecting a visual enrichment of the set of visual enrichments corresponding to each data value in the column; and
displaying for each data value of the column the corresponding visual enhancement.

7. The method of claim 5, wherein said displaying at least one visual enrichment of the set of visual enrichments in the table of data in the document comprises:
inserting a new column into the table; and
displaying visual enrichments of the set of visual enrichments in the new column.

8. The method of claim 5, wherein said displaying at least one visual enrichment of the set of visual enrichments in the table of data in the document comprises:
displaying at least one visual enrichment of the set of visual enrichments as a background to the column.

9. The method of claim 5, further comprising:
enabling a graph to be generated based at least on the data stored in the column that displays the at least one visual enrichment in the graph.

10. The method of claim 1, wherein the selected enhancement information is a set of reference data associated with the determined category, wherein said displaying comprises:
displaying at least a portion of the reference data in the table.

11. The method of claim 10, wherein said displaying at least a portion of the reference data in the table comprises:
selecting a reference data value of the reference data corresponding to each data value in the column;
inserting a new column into the table; and
displaying for each data value of the column the corresponding selected reference data value.

12. A system, comprising:
at least one processor;
an enhancement retriever, executing on the at least one processor, that automatically retrieves enhancement information, from a plurality of stored data sets, associated with an automatically determined category of data stored in a column of a table of data contained in a document that is digital based on a semantic comparison, using the at least one processor, of a plurality of data values corresponding to different rows of the column, the enhancement information comprising one or more of visual enrichments, reference data, attributes enrichments, and geographic enrichments, and the enhancement retriever configured to automatically retrieve the enhancement information responsive to performance of the semantic comparison;
a user interface module that provides a user interface that enables a user to select enhancement information of the retrieved enhancement information; and
a column modifier that enables the selected enhancement information to be displayed in the table of data contained in the document;
the user being enabled to accept or reject the selected enhancement information to be stored in the document via a provided accept option and a provided reject option.

13. The system of claim 12, further comprising:
a column analyzer that determines the category of the data stored in the column of the table of data contained in the document, the column analyzer configured to semantically compare the data of the column with a plurality of stored data sets to determine the category of data, the stored data sets corresponding to a plurality of data categories.

14. The system of claim 12, wherein the enhancement retriever retrieves the enhancement information from at least one of a network-based data source, a search engine, or a network-based reference portal.

15. The system of claim 14, further comprising:
a graph generator that enables a graph to be generated that displays the at least one visual enrichment based at least on the data stored in the column.

16. The system of claim 12, wherein the selected enhancement information is a set of visual enrichments associated with the determined category, wherein the column modifier enables at least one visual enrichment of the set of visual enrichments to be displayed in the table of data contained in the document.

17. The system of claim 16, wherein the column modifier selects a visual enrichment of the set of visual enrichments corresponding to each data value in the column, and displays for each data value of the column the corresponding selected visual enhancement.

18. The system of claim 16, wherein the column modifier is configured to insert a new column into the table and insert visual enrichments of the set of visual enrichments in the new column.

19. The system of claim 12, wherein the selected enhancement information is a set of reference data associated with the determined category, wherein the column modifier enables at least a portion of the reference data to be displayed in the table.

20. The system of claim 19, wherein the column modifier selects reference data values of the reference data corresponding to data values in the column, inserts a new column into the table, and inserts the selected reference data values into the new column.

* * * * *